United States Patent [19]
Madsen

[11] 3,872,015
[45] Mar. 18, 1975

[54] APPARATUS FOR SEPARATING FLUIDS INTO TWO FRACTIONS BY MEANS OF SEMIPERMEABLE MEMBRANES

[75] Inventor: Rud Erik Madsen, Nakskov, Denmark

[73] Assignee: Aktieselskabet De Danske Sukkerfabrikker, Copenhagen, Denmark

[22] Filed: Feb. 2, 1973

[21] Appl. No.: 329,196

[30] Foreign Application Priority Data
Feb. 2, 1972 United Kingdom .............. 4971/72

[52] U.S. Cl. .............................. 210/346, 210/433
[51] Int. Cl. ........................................ B01d 31/00
[58] Field of Search .......... 210/321, 346, 433, 336; 159/DIG. 27; 55/158

[56] References Cited
UNITED STATES PATENTS

| | | |
|---|---|---|
| 3,323,652 | 6/1967 | Huffman .......................... 210/321 |
| 3,398,833 | 8/1968 | Marks et al. .................... 210/347 X |
| 3,398,834 | 8/1968 | Huttall et al. ................... 210/433 X |
| 3,520,803 | 7/1970 | Iaconelli .............................. 210/23 |
| 3,623,610 | 11/1971 | Olsen et al. ..................... 210/433 X |

Primary Examiner—Frank A. Spear, Jr.
Attorney, Agent, or Firm—Watson, Cole, Grindle & Watson

[57] ABSTRACT

An apparatus for separating liquids into two fractions by reverse osmosis or ultrafiltration comprising a stack of alternating membranes and membrane supports, said stack having two spaced longitudinally extending holes with a bolt inserted in each hole so as to form annular flow passages extending along the surfaces of said bolts, closing discs being provided at suitable levels on each bolt so as to stop the flow of liquid in the longitudinal direction of the stack and to direct the flow parallel to the membrane surfaces towards the opposite flow passage thus obtaining a combined parallel and series flow pattern.

4 Claims, 3 Drawing Figures

3,872,015

APPARATUS FOR SEPARATING FLUIDS INTO TWO FRACTIONS BY MEANS OF SEMIPERMEABLE MEMBRANES

BACKGROUND OF THE INVENTION

This invention relates to an apparatus for separating liquids into two fractions by means of semipermeable membranes and more particularly to an apparatus for the separation of a liquid into two fractions by reverse osmosis or ultrafiltration.

A prior art apparatus of this type comprises a stack of membrane supports, each membrane support supporting at least one semipermeable membrane so as to form a flow passage extending parallel to the membrane surface, liquid inlet and liquid outlet means communicating with said flow passages, means for collecting and discharging liquid passing through said membranes and means for compressing the stack of membrane supports and membranes.

In a prior art apparatus of this type the liquid to be treated flows through a large number of flow passages each formed between a membrane and a membrane support and the liquid passes through said passages either in a series or in a parallel flow pattern.

In order to obtain an efficient operation of such an apparatus it is essential that the liquid to be treated flows along the membranes in the form of a thin film and at a high flow rate in order to prevent the accumulation of solid material in the form of coatings on the membrane surfaces. Furthermore, it is essential that the pressure drop across the apparatus is low in order to minimize the energy consumption and to obtain uniform conditions throughout the apparatus.

In an apparatus in which liquid to be treated is successively passed along the membrane surfaces, a high flow rate is obtainable only at the expense of a high pressure drop. In the case of parallel flow, however, the filtration capacity of the membranes is low.

The object of the invention is to provide an apparatus having a large exposed membrane surface area and combining the advantages of series flow with those of parallel flow of the liquid to be treated.

SUMMARY OF THE INVENTION

According to the invention, an apparatus of the above mentioned type comprises two spaced flow passages, each extending longitudinally through said stack and closing means provided at spaced locations in said longitudinal flow passages so as to deflect a liquid flowing through such a longitudinal flow passage into the flow passages extending parallel to the membrane surfaces.

In the apparatus of the invention the liquid to be treated is introduced into the apparatus through the liquid inlet means from which it flows into one of the two longitudinal flow passages. At some distance from the point at which the liquid is introduced into said longitudinal flow passage, the latter is closed by the above mentioned closing means. Consequently, the liquid introduced is forced to flow in a parallel flow pattern along the supported membranes towards the second longitudinal flow passage. When the liquid reaches said second longitudinal flow passage, it is deflected and passes further down through the stack until it reaches a closing means provided in said second longitudinal flow passage. The liquid is then forced to flow in a parallel flow pattern towards the first longitudinal flow passage. In the first longitudinal flow passage the liquid then flows further down through the stack and in a parallel flow pattern towards the second longitudinal flow passage. This zigzag flow then continues until the liquid reaches the end of the longitudinal flow passage connected to the liquid discharge means. As will appear from the above explanation the flow of liquid through the apparatus of the invention is a combination of series and parallel flow. This flow pattern makes it possible to obtain a high flow rate at an acceptable pressure drop across the apparatus. Furthermore, if each membrane support supports a membrane on each side thereof so that the liquid flowing from one longitudinal flow passage towards the second longitudinal flow passage is in contact with two membrane surfaces, a high capacity can be obtained.

The apparatus of the invention is assembled by placing a plurality of membrane supports each provided with two holes and covered on at least one side with a semipermeable membrane on top of one another with aligned holes so as to form said two longitudinal flow passages. Sealing means, e.g., in the form of small discs are inserted in the holes of said membrane supports at desired levels in each flow passage and the stack is then compressed by said compressing means. Thus, it is apparent that the apparatus can be easily assembled so as to obtain optimum flow conditions for a given liquid to be treated.

In a preferred embodiment of the invention the compressing means comprises two bolts each connected to end flanges at the end of the stack and each inserted in a longitudinal flow passage so as to form annular flow passages along the surfaces of said bolts.

A further preferred embodiment of the invention comprises a stack of ellipsoidal membrane support plates provided with holes located at opposite ends of said support plates.

It is particularly advantageous to use such ellipsoidal membrane support plates because when the stack is compressed, the pressure exerted on the edges of the membrane support plates is substantially uniform along the periphery of said plates.

In case bolts are inserted in the longitudinal flow passages, the closing means preferably are annular rings having an inner diameter closely fitting to the outside of said bolts. These annular rings can easily be inserted on the bolts when assembling the stack of membrane supports and membranes. The closing means are preferably provided with means for maintaining the edges of the membrane in intimate contact with the membrane supports.

DESCRIPTION OF THE PREFERRED EMBODIMENTS

Figure 1:
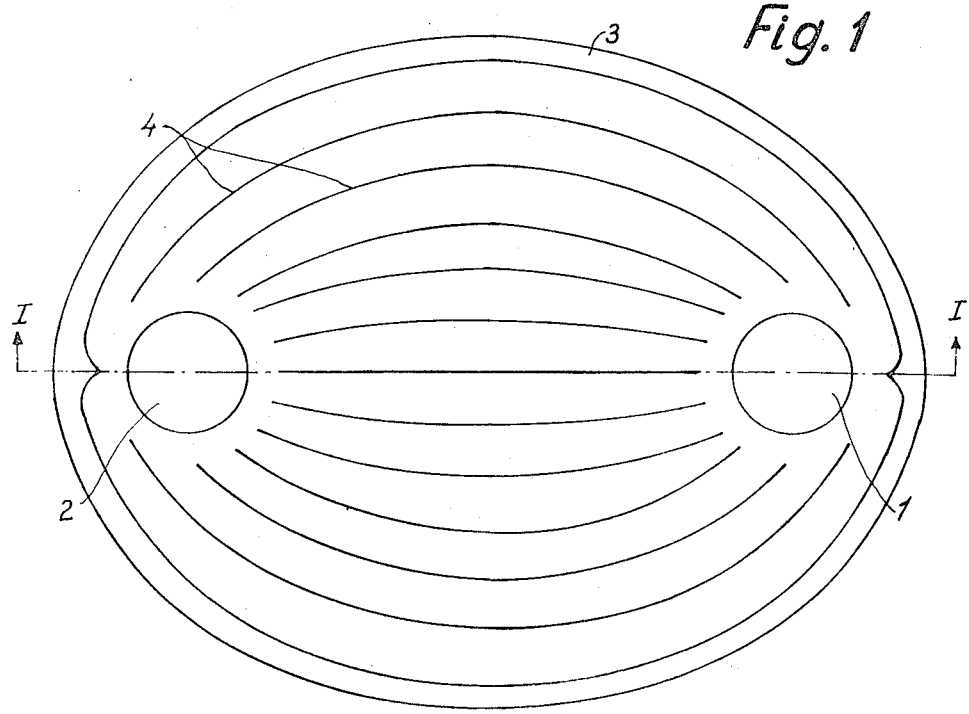
FIG. 1 shows a membrane support plate shown in top view.
Figure 2:
FIG. 2 shows a cross-sectional view of the membrane support plate illustrated in FIG. 1 along the line I—I.

The ellipsoidal membrane support plate illustrated in FIG. 1 comprises two holes 1 and 2 and an annular peripheral sealing flange 3. It also comprises curved ribs 4 which serve to press the adjacent membranes together within narrow zones. The area between adjacent ribs 4 is provided with grooves (not shown) extending substantially parallel to said ribs.

Figure 3:
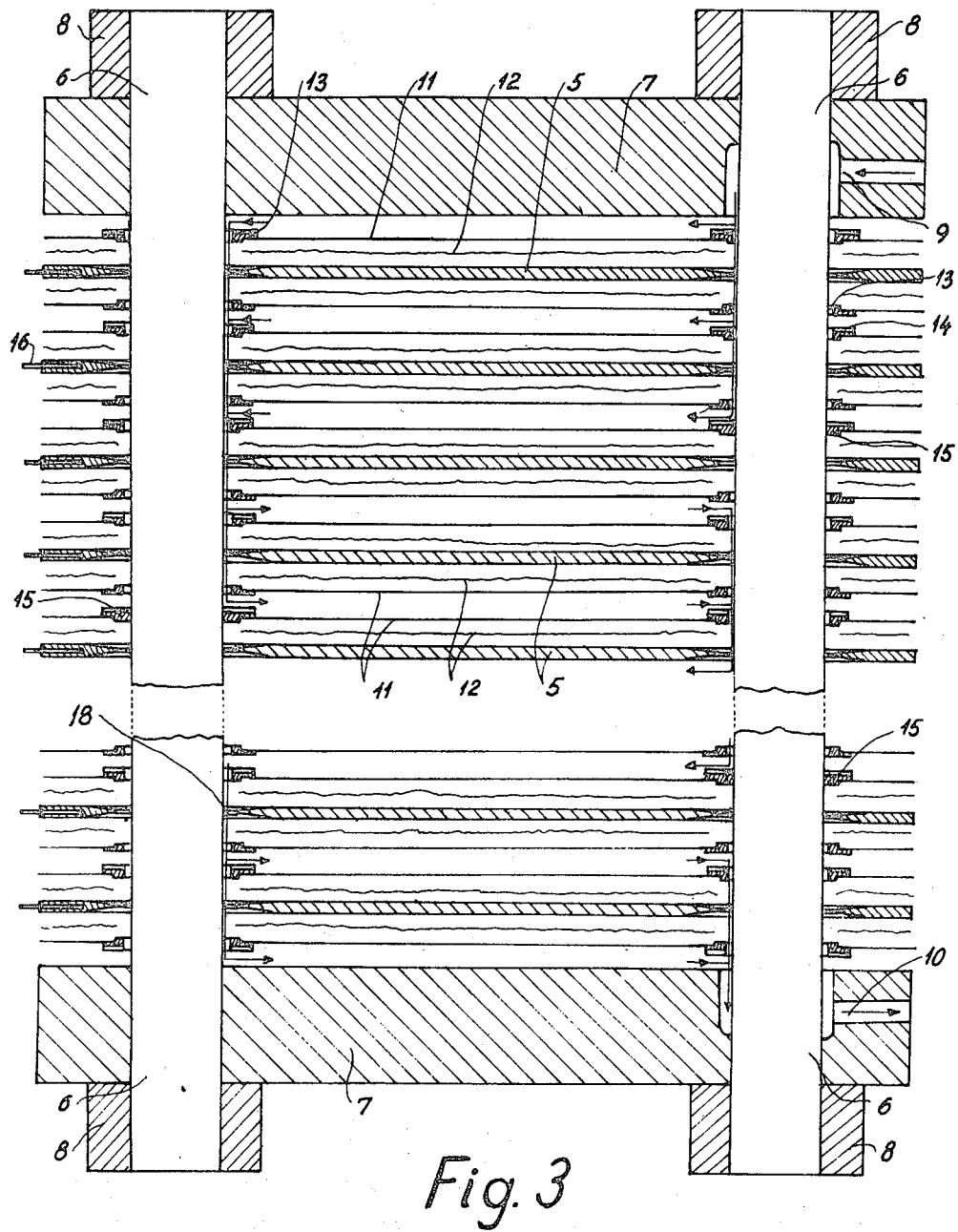
FIG. 3 shows a vertical sectional view of an apparatus of the invention in which the elements are separated from one another for the sake of clarity.

The apparatus illustrated in FIG. 3 comprises a stack of membrane plates 5 which are mounted on two bolts 6 between two end plates 7. The assembly of end plates and membrane supports is pressed together by means of nuts 8 which are screwed onto the ends of the bolts 6. The upper end plate 7 comprises an inlet flow passage 9 and the lower end plate comprises an outlet flow passage 10.

The apparatus also comprises membranes 11 located on opposite sides of each membrane support plate 5. Sheets 12 of filter paper are located between each member 11 and the adjacent membrane support plate 5. The membranes 11 and the adjacent filter paper sheets 12 are attached to the membrane support plates 5 by means of sealing rings 13 having an inner diameter greater than the outer diameter of the bolts so as to form an annular flow passage between the inside of said rings and the bolts 6. Some of the sealing rings 13 are provided with cams 14 which serve to keep adjacent sealing rings spaced apart.

At different levels on each bolt there are provided closing rings 15 which are in contact with the surface of the bolts so as to close the annular main flow passages 18 extending parallel to the bolts.

The liquid to be treated is introduced in the apparatus illustrated in FIG. 3 through the inlet flow passage 9. The liquid thus introduced flows down through the stack until it reaches the closing ring 15. At this level the liquid flow is deflected so as to pass in the zones between adjacent membranes as illustrated in FIG. 3 and towards the opposite annular flow passage. When the liquid flow reaches the opposite annular flow passage it is again deflected and passes down through the stack until it reaches the closing ring 15 terminating said annular flow passage. The liquid is then again deflected so as to flow towards the first mentioned bolt. In this manner the liquid flows in a zigzag pattern down through the stack until it reaches the outlet flow passage 10.

The liquid penetrating the membranes and the sheets of filter paper passes out through pipes 16 inserted in the edges of the membrane support plates. These pipes 16 are connected with the surfaces of the membrane support plates through holes (not shown in the drawings). The liquid passing out of the apparatus through the pipes 16 is collected as a filtrate.

I claim:

1. Apparatus for separating liquids into two fractions by means of semipermeable membranes, comprising:

a stack of membrane supports, each membrane support supporting at least one semipermeable membrane so as to form a flow passage extending parallel to the membrane surface;

liquid inlet and liquid outlet means communicating with said flow passages;

means for collecting and discharging liquid passing through said membranes; and means for compressing the stack of membrane supports and membranes, said means for compressing including two spaced bolts connected to end flanges at the end of the stack, each bolt being inserted in aligned holes in said membrane supports and membranes to form around said bolt an annular flow passage extending longitudinally through said stack and communicating with a plurality of adjacent flow passages extending parallel to the membrane surfaces over which adjacent passages the liquid flows in the same direction, and a plurality of closing means provided at spaced locations in said longitudinal annular flow passages so as to deflect a liquid flow through such a longitudinal annular flow passage into the flow passages extending parallel to the membrane surfaces.

2. An apparatus as in claim 1, characterized in that the membrane supports are ellipsoidal plates provided with holes located at opposite ends of said plates.

3. An apparatus as in claim 2, characterized in that the closing means are annular rings having an inner diameter closely fitting to the surface of said bolts.

4. An apparatus as in claim 1, characterized in that the sealing means are provided with means for maintaining the edges of the membranes in intimate contact with the membrane supports.

* * * * *